March 22, 1960 N. C. HUSTED 2,929,861
JUNCTION ASSEMBLY FOR SECONDARY TERMINAL TAKE-OFFS
Filed July 8, 1958
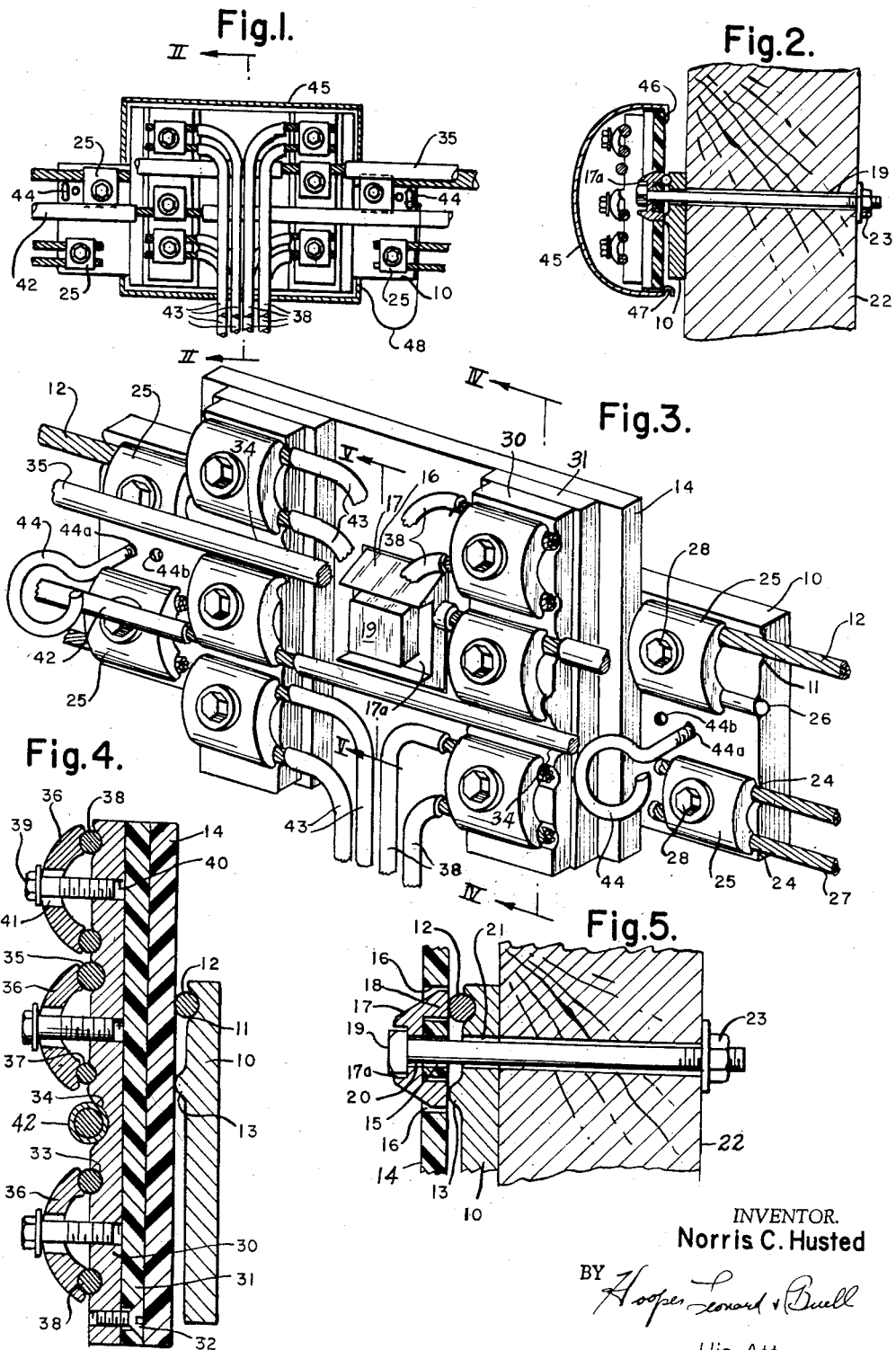
INVENTOR.
Norris C. Husted
BY Hooper Leonard & Buell
His Attorneys.

United States Patent Office 2,929,861
Patented Mar. 22, 1960

2,929,861

JUNCTION ASSEMBLY FOR SECONDARY TERMINAL TAKE-OFFS

Norris C. Husted, Gibsonia, Pa.

Application July 8, 1958, Serial No. 747,192

12 Claims. (Cl. 174—43)

This invention relates to electrical junctions and particularly to secondary terminal take-off junction assemblies. One of the problems of electrical distribution in urban areas is that of connecting secondary distribution lines to customer circuits in a simple, safe and expeditious manner. Many types of apparatus have been proposed, but they have been either expensive to assemble or for one or more reasons unsatisfactory to use. As a result the connection of secondary junctions has been plagued with problems.

I have invented a new junction assembly which is relatively inexpensive, easily installed, and positive in its action. In a preferred embodiment of the invention, I provide an elongated substantially flat first conductor member, means for fixing one of a plurality of conductor wires to said conductor member, insulator means covering a substantial area of said conductor and held thereon by the means for fixing a conductor wire to the conductor members, a multiplicity of spaced second conductor members or bus bars fixed to said insulator means and extending transversely to the length of said first conductor means, means in each of said bus bars adapted to receive one of the conductor wires and the ends of wires to be connected to said conductor wire and clamp means holding said wire ends on said conductor members. Preferably the first conductor member is an elongated flat plate having a slot adapted to receive a ground or neutral wire running lengthwise from end to end, and the insulator means is a flat plate of rigid weather resistant plastic material adapted to overlie the central portion of the first conductor member and be held in place by clamping means passing through spaced slots therein and bearing simultaneously on the ground wire and first conductor member, whereby to form a unitary structure fixed on the ground wire. Preferably the second conductor members or bus bars are provided with spaced slots adapted to receive wire ends to be connected and a portion of one of the conductor wires.

In the foregoing general description, I have outlined certain objects, purposes and advantages of my invention, however, other objects, advantages and purposes will be apparent from the consideration of the following description of a present preferred embodiment and the accompanying drawings in which Figure 1 is a front elevation of a preferred embodiment of my invention;

Figure 2 is a section on the line II—II of Figure 1;

Figure 3 is an isometric view of the embodiment shown in Figure 1;

Figure 4 is a section on the line IV—IV of Figure 3; and

Figure 5 is a segmental section on the line V—V of Figure 3.

Referring to the drawings, I have illustrated a first conductor or neutral plate member 10 of elongated quadrangular form having a slot 11 extending lengthwise thereof. The slot 11 is adapted to receive a ground or neutral wire 12 in conductive contact therewith. Preferably a raised spacing rib 13 is formed on base member 10 parallel to the slot 11. An insulator block or pad of weather-resisting plastic 14 is placed over the base member. The pad 14 is provided with an opening 15 and a pair of slots 16, one on each side of the opening 15. A clamping member 17 of generally U-shape (see Figure 5) having legs 18 adapted to pass through slots 16 and engage the wire 12 and the rib 13 and a recess 17a on the side opposite the legs 18. A bolt 19 passes through an opening 20 in the member 17 with its head resting in recess 17a, through opening 15 in the insulator pad 14 and an opening 21 in the base member 10 and through a pole 22 on which the junction is to be mounted. A nut 23 is threaded onto the bolt 19 to tighten clamping member 17 onto the wire 12 whereby to cause the entire structure to become an immovable unit. Short grooves 24 are formed in the base member 10 at either end paralel to the lengthwise slot 11. One of the grooves is paired with the slot 11 at each end to receive a U-shaped clamping member 25 which acts on wire 12 and alternatively on a plug 26 which is in the form of a metal cylinder whose diameter is approximately that of a drop wire or transformer tap or the end of a drop wire (not shown). The other grooves are paired to receive like clamping members 25 and ground wires 27. The clamping members 25 are held in place by bolts 28 threaded into the base member 10 between the paired grooves. Second conductor members or bus bars 30 are fixed to insulator bars 31 preferably by bolts 32. These bars 31 are then cemented to the insulated pad 14 transverse to the length of base member 10. Each bus bar is provided with spaced paired grooves 33 and a single groove 34 spaced to one side of the middle of the member. One of the grooves 33 of one bus bar is used to receive a bared portion of an insulated main conductor member 35. The bared portion of conductor member 35 is held by one leg of a U-shaped clamp 36 identical with members 25. The other groove 33 of the pair in which conductor 35 is fixed may be filled with a plug 37 or a drop wire or transformer tap (not shown). The other grooves 33 are paired to receive drop wires 38 held by U-shaped clamping members 36. Bolts 39 threaded into holes 40 in bus bars 30 hold clamping members 36 through openings 41 in the center thereof. This provides a solid reliable resilient connection. The other bus bar is arranged on the opposite side of the center of insulator pad 14 and receives a third conductor member 42 and drop lines 43 in exactly the same manner as the bus bar just described. The two bus bars are arranged so that the grooves 34 in each are out of alignment to receive and pass insulated conductor members 35 and 42.

Eyebolts 44 are provided in tapped holes 44a in each end of the neutral plate 10 to receive ties (not shown) which take the load of the customer's service wires and relieve the terminals of the pull and tension that would eventually result in electrical failure. Tapped holes 44b are provided in the back of neutral plate 10 at each end for eyebolts (not shown) similar to bolts 44 to accommodate anchorage for service wires approaching from the back.

A clear plastic cover 45 having a lip 46 adapted to fit behind neutral plate 10 is provided to cover the junctions on the bus bars and the insulator pad. The cover is provided with spring clips 47 on the edge opposite lip 46 to releasably engage the neutral plate to hold the cover in position. A tie 48 is provided on the cover to prevent its loss when removed from position. This cover enables the lineman to inspect the interior of junctions before removal of the cover alerting him to the presence of insects such as wasps, hornets, bees, or the like and prevent injuries or even loss of life by falling.

The unit can be assembled on a neutral wire without using a pole for support (see Fig. 3). In this case a short bolt, just long enough to pass through insulator pad 12 and neutral plate 10 is the fastening member.

The advantages of this unit are obvious. Maintenance and installation costs are lower, pole lengths may be reduced, and the assembly is neater and much more flexible than conventional secondary racks and devices now used. The device of the invention has the further advantage that it can be installed anywhere on the lines either at a pole or in the span between poles.

While I have illustrated certain preferred embodiments of my invention it will be understood that the invention may be otherwise embodied within the scope of the following claims.

I claim:

1. A junction assembly comprising an elongated first conductor member, a groove extending lengthwise of said conductor member and adapted to receive one of a plurality of conductor wires, an insulator plate covering said wire and a substantial area of said first conductor member, means fixing the conductor wire and plate on the first conductor member, a multiplicity of spaced bus bars fixed to said insulating plate transverse to the length of said first conductor member, means on each of said bus bars adapted to receive in conductive relationship one of said plurality of conductor wires, groove means in said bus bars adapted to receive the ends of wires to be connected to said conductor wire, clamp means holding said wire ends on said bus bar and cover means covering said bus bars and the junction therein.

2. A junction assembly comprising an elongated metallic neutral plate, a groove extending lengthwise of said plate and adapted to receive a neutral wire of a plurality of wires, a plurality of grooves beginning at each end of said plate and terminating intermediate the ends thereof adapted to receive the ends of neutral drop lines, clamp means adapted to act on said wire ends to hold them in conductive contact with said plate, at least one of said clamp means at each end of the plate engaging the neutral wire, an insulator plate covering a substantial portion of the neutral plate and the neutral wire thereon, means fixing the conductor wire and insulator plate on the neutral plate, a multiplicity of spaced bus bars fixed to said insulating plate transverse to the length of the neutral plate, groove means in each bus bar adapted to receive in conductive relationship one of said plurality of conductor wires, spaced groove means in said bus bars adapted to receive the ends of drop wires to be connected, clamp means holding said wire ends on said bus bar and cover means covering said bus bars and the junction thereon.

3. A junction assembly as claimed in claim 2 wherein the clamp means are U-shaped members, the end of whose legs engage the wire ends in the several grooves and bolts acting on the center of the U-shaped member to resiliently clamp the wire ends in place.

4. A junction assembly as claimed in claim 2 wherein the insulator plate is provided with spaced slots and the means fixing said plate to the neutral plate is provided with legs passing through the slots to engage the neutral wire and plate in integral relation.

5. A junction assembly as claimed in claim 2 wherein the bus bars are provided with stepped grooves to pass each main conductor wire not connected thereto.

6. A junction assembly comprising an elongated metallic neutral plate, a groove extending lengthwise of the plate and adapted to receive one of a plurality of conductor wires, a spacing rib spaced from said groove and parallel thereto intermediate the ends of the neutral plate, an insulator plate covering said rib and a substantial part of the neutral plate and the neutral wire thereon, spaced parallel slots in said insulator plate adapted to index over the rib and groove in the neutral plate, clamp means engaging the insulator plate and having legs adapted to pass through said slots engaging the rib and the neutral wire whereby the insulator plate, neutral wire and neutral plate become a unit, clamp means at each end of the neutral plate engaging and clamping the neutral wire in the groove therein, a pair of spaced bus bars fixed to the insulator plate transverse to the length of the neutral plate and spaced therefrom by the insulator plate, groove means in each bus bar adapted to receive in conductive relationship one of said plurality of conductor wires in spaced generally parallel relationship, clamp means engaging said conductor wires in resilient relationship to hold the wires fixed in the grooves, and spaced means on each of the neutral plate and bus bars receiving drop wires in conductive relationship.

7. A junction assembly as claimed in claim 6 wherein the spaced means on each of the neutral plate and bus bars receiving the drop wires in conductive relationship are paired grooves with cooperating U-clamps, the legs of which resiliently engage the wires to hold them in conductive relation.

8. A junction assembly as claimed in claim 6 wherein the clamp means engaging the insulator plate is a U-shaped clamp having legs passing through the slots of the insulator plate, a recess on the side opposite the legs and a bolt passing through the insulator plate and the neutral plate to hold the two together, the head of said bolt lying in the recess of the U-shaped clamp.

9. A junction assembly as claimed in claim 8 wherein the bolt is adapted to pass through a supporting member.

10. A junction assembly as claimed in claim 6 having a cover means covering the bus bars, and junctions thereon and retaining means removably holding said cover means in place.

11. A junction assembly comprising an elongated first conductor member, a groove extending lengthwise of said conductor member and adapted to receive one of a plurality of conductor wires, an insulator plate covering said wire and a substantial area of said first conductor member, means fixing the conductor wire and plate on the first conductor member, a multiplicity of spaced bus bars fixed to said insulating plate transverse to the length of said first conductor member, means on each of said bus bars adapted to receive in conductive relationship one of said plurality of conductor wires, groove means in said bus bars adapted to receive the ends of wires to be connected to said conductor wire, clamp means holding said wire ends on said bus bar, cover means covering said bus bars and the junction therein and eye bolt means on the first conductor member for holding and supporting the conductor wires whereby the load of said wires is removed from the clamp means.

12. A junction assembly comprising an elongated metallic neutral plate, a groove extending lengthwise of the plate and adapted to receive one of a plurality of conductor wires, a spacing rib spaced from said groove and parallel thereto intermediate the ends of the neutral plate, an insulator plate covering said rib and a substantial part of the neutral plate and the neutral wire thereon, spaced parallel slots in said insulator plate adapted to index over the rib and groove in the neutral plate, clamp means engaging the insulator plate and having legs adapted to pass through said slots engaging the rib and the neutral wire whereby the insulator plate, neutral wire and neutral plate become a unit, clamp means at each end of the neutral plate engaging and clamping the neutral wire in the groove therein, a pair of spaced bus bars fixed to the insulator plate transverse to the length of the neutral plate and spaced therefrom by the insulator plate, groove means in each bus bar adapted to receive in conductive relationship one of said plurality of conductor wires in spaced generally parallel relationship, clamp means engaging said conductor wires in resilient relationship to hold the wires fixed in the grooves, spaced means on each of the neutral plate and bus bars receiving drop wires in conductive relationship and eye bolt means adjacent each end of the neutral plate for holding and supporting the conductor wires adjacent the neutral plate whereby the load of said wires is removed from the clamp means.

References Cited in the file of this patent

UNITED STATES PATENTS

| | | |
|---|---|---|
| 1,979,091 | Alsaker et al. | Oct. 30, 1934 |
| 2,281,515 | Ruggieri | Apr. 28, 1942 |